United States Patent
Minemura et al.

(10) Patent No.: US 7,738,349 B2
(45) Date of Patent: Jun. 15, 2010

(54) OPTICAL DISC DEVICE WITH NORMAL RESOLUTION SIGNAL SELECTION FILTER

(75) Inventors: Hiroyuki Minemura, Kokubunji (JP); Toshimichi Shintani, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 658 days.

(21) Appl. No.: 11/705,021

(22) Filed: Feb. 12, 2007

(65) Prior Publication Data
US 2008/0159103 A1    Jul. 3, 2008

(30) Foreign Application Priority Data
Dec. 28, 2006  (JP) .............................. 2006-355931

(51) Int. Cl.
  *G11B 7/00* (2006.01)
(52) U.S. Cl. ................. 369/124.1; 369/53.31
(58) Field of Classification Search .............. None
   See application file for complete search history.

(56) References Cited

U.S. PATENT DOCUMENTS

| | | | |
|---|---|---|---|
| 2002/0080696 A1 | 6/2002 | Wakabayashi et al. | |
| 2003/0147318 A1 | 8/2003 | Wakabayashi et al. | |
| 2004/0100881 A1 | 5/2004 | Wakabayashi et al. | |
| 2004/0100882 A1 | 5/2004 | Wakabayashi et al. | |
| 2005/0106508 A1 | 5/2005 | Shintani et al. | |
| 2005/0259551 A1 | 11/2005 | Kudo et al. | |
| 2006/0072434 A1 | 4/2006 | Shintani et al. | |
| 2008/0065962 A1* | 3/2008 | Song et al. ................... | 714/774 |

FOREIGN PATENT DOCUMENTS

| | | |
|---|---|---|
| JP | 2005-100526 | 4/2005 |
| JP | 2005-332453 | 12/2005 |
| JP | 3781911 | 3/2006 |
| JP | 2006-107588 | 4/2006 |

* cited by examiner

*Primary Examiner*—Paul Huber
(74) *Attorney, Agent, or Firm*—Antonelli, Terry, Stout & Kraus, LLP.

(57) ABSTRACT

A normal resolution component included in a readout signal of a super resolution optical disc is canceled to improve quality of the readout signal. The normal resolution component is separated from the readout signal of the super resolution optical disc by using a normal resolution selection filter such as a low pass filter, a mark length determination circuit, and then the normal resolution component is subtracted from an original readout signal while gain and a phase are appropriately controlled. Thereby, an influence of crosstalk due to the normal resolution component is reduced.

6 Claims, 13 Drawing Sheets bit error rate=1.4x10⁻²

Initial Signal bit error rate<1x10⁻⁶

Processed Signal

US 7,738,349 B2

OPTICAL DISC DEVICE WITH NORMAL RESOLUTION SIGNAL SELECTION FILTER

CLAIM OF PRIORITY

The present application claims priority from Japanese application JP 2006-355931 filed on Dec. 28, 2006, the content of which is hereby incorporated by reference into this application.

BACKGROUND OF THE INVENTION

1. Field of the Invention

The present invention relates to an optical disc device which forms a recording mark having a different physical characteristic from that of the other portion, on a recording medium to read information from the optical disc on which information is recorded.

2. Description of the Related Art

Optical disc media include various media, such as a CD-R/RW, a DVD-RAM, a DVD±R/RW, a Blu-ray Disc (hereinafter referred to as a BD), and a HD DVD. Such optical disc media including one with two data layers have been widely used. What is termed as a DVD super multi-drive, which is provided for writing/reading on/from a CD-R/RW, a DVD-RAM and a DVD±R/RW, has widely available as the corresponding optical disc device. A high-performance drive, which is provided for a BD and a HD DVD, is considered to be widely available in the future.

Super resolution techniques and SIL (Solid Immersion Lens) for next-generation large-capacity optical discs are proposed, and one of the super resolution techniques is described in Japanese Patent Application Laid-open No. 2006-107588. Specifically, a phase-change recording film, which changes its optical characteristics when it melts, is buried in pits to conduct super resolution reading. In addition, recording marks are spatially separated from each other to reduce thermal interference between the recording marks and fluctuation of a super resolution region. The aforementioned configuration makes it possible to improve linear density and track density at the same time. As a result, storage capacity of the optical disc can be largely increased. Furthermore, light transmittance of the region between data pits is increased to allow an increase in an average light transmittance of a data surface. Thus, efficiency in light utilization is high, and this is advantageous for a multi-layering process. This type is hereinafter called as a three-dimensional pit selection type. As means for burying the recording film in the pits, it is possible to use a phase-change etching method (a method using a difference in etching speed between liquid crystal and amorphous) as described in Japanese Patent Application Laid-open No. 2005-100526, and a physical polishing method such as CMP (Chemical Mechanical Polishing).

When a super resolution optical disc is read, a super resolution signal is obtained from a mark smaller than optical resolution. Meanwhile, in a case where there is a mark larger than the optical resolution, a similar signal to that in a case of the normal optical disc is obtained. This signal is hereinafter called as a normal resolution signal. Thus, a readout signal of the super resolution optical disc results in such a nonlinear signal to which a super resolution signal and a normal resolution signal are added. Accordingly, instead of a general readout signal processing method, a nonlinear processing method needs to be carried out to obtain a good-bit error rate.

Japanese Patent No. 3781911 describes a nonlinear signal processing method in which a coefficient of equalization is changed according to a level of a readout signal. Furthermore, Japanese Patent Application Laid-open No. 2005-332453 describes a signal processing method in which crosstalk from adjacent tracks is suppressed using readout signals from three beam spots.

SUMMARY OF THE INVENTION

FIG. 2 is a schematic cross-sectional view illustrating a configuration example of a three-dimensional pit selection type disc. A disc substrate is a PC substrate having a RLL (1, 7) modulation pattern with a shortest pit length of about 150 nm and a pit length of 68 nm. An AgPdCu alloy thin film (with the thickness of 35 nm) as a reflective film, a BiGeSbTe alloy thin film (with the thickness of 15 nm) as a phase-change recording film, and $Al_2O_3$ dielectric films (each of which thicknesses is as shown in FIG. 2) as protective films are used. A CMP processing method is used as processing for burying a phase-change recording film in a pit portion. The readout signal is measured by an evaluation device provided with an optical head having a wavelength λ of 405 nm and an objective lens with a numerical aperture NA of 0.85. At this time, a $1/e^2$ diameter (λ/NA) of a beam spot is about 476 nm.

FIG. 3 is a diagram illustrating a measurement result of readout signals. Here, readout signals are measured under two conditions of readout powers of 0.3 mW (low power) and 3.5 mW (high power) based on a linear speed of 4.92 m/s. In FIG. 3, signals to which a gain correction is applied according to readout power are shown. As shown in FIG. 3, a super resolution effect occurs due to melting of a phase-change recording film, and thus signal amplitude of a mark portion is increased. In this experiment, a ratio in amplitude between the time of lower power readout and that of high power readout is about 1:1.3. Accordingly, amplitude of a super resolution signal is about 0.3 with respect to amplitude of a normal resolution signal.

FIG. 4 is a view schematically illustrating signals obtained at the time of high power readout. As shown in FIG. 4, in a case of a normal resolution signal, amplitude of marks smaller than optical resolution is zero. In contrast, in a case of a super resolution signal, high signal amplitude can be obtained from marks smaller than optical resolution. A signal, which can be obtained at the time of reading a super resolution disc, corresponds to a signal obtained by adding both signals to the readout signal. Meanwhile, in a medium such as a three-dimensional pit selection type disc which obtains a super resolution effect using thermal energy, delay (Δ in FIG. 4) occurs in the super resolution signal by an amount corresponding to a thermal response delay. For this reason, good data readout cannot be expected from the readout signal to which two signals, each with a different phase and amplitude, are added. When attention is turned to the super resolution signal, the normal resolution signal can be considered as crosstalk.

An object of the present invention is to reduce crosstalk of a normal resolution signal to read data of good quality from a super resolution disc. The technique for decreasing an influence of the normal resolution signal is hereinafter referred to as a normal resolution crosstalk cancel technique. Descriptions will be provided below for a problem caused in a case where the conventional techniques are applied for the purpose of normal resolution crosstalk cancel.

Japanese Patent No. 3781911 describes a nonlinear equalization method in which gain is increased in a case where a readout signal level is low, and in which gain is decreased in a case where the readout signal level is high. Thereby, amplitude of a short signal is increased without increasing intersymbol interference to obtain a high S/N. The above publication shows that a numerical aperture of eye is improved by nonlinear equalization. However, as described in the same publication, the above method reduces gain at an edge portion where the readout signal level is low. For this reason, improving effect of an edge shift amount is small. Accordingly, as for the readout signal of a super resolution disc, in which a phase difference exists between the super resolution signal and the normal resolution signal, it can be said that improving effect of signal quality is low.

Japanese Patent Application Laid-open No. 2005-332453 describes a method in which sub-spots are formed respectively on tracks inside and outside of a track which is read by a main spot, and in which readout signals obtained from these three beam spots are used to reduce crosstalk from adjacent tracks. This method cannot be applied to signal processing of the super resolution disc unless the configuration is changed. However, the main spot and sub-spots are arranged on the same track as shown in FIG. 5 to thereby obtain a normal resolution signal from the sub-spots in a case where power of the main spot is higher than threshold power of super resolution readout, and where power of the sub-spots is lower than threshold power of super resolution readout. Hence, it is theoretically possible to implement normal resolution crosstalk cancel. However, an optical head with three beam spots formed on the same track is a special type of optical head, and an increase in the costs of the optical head is inevitable for implementing an optical disc device compatible with not only the super resolution disc but also with the conventional optical disc. The super resolution optical disc is advantageous over the other technique in that large capacity can be obtained basically by control of readout power only. Accordingly, it is desirable that normal resolution cancel be implemented only by the readout circuit techniques without using the special optical head. As mentioned above, in the conventional technique, implementing normal resolution cancel is difficult in view of both performance and costs. An object of the present invention is to provide an optical disc device which implements normal resolution cancel only by readout circuit techniques to allow data with good quality to be read from a super resolution disc.

In the present invention, a normal resolution component is separated from a readout signal of a super resolution optical disc by using a normal resolution selection filter, and the normal resolution component is subtracted from an original readout signal while gain and a phase are being appropriately controlled. Thereby, an influence of crosstalk due to the normal resolution component is reduced. The normal resolution component is a signal component caused by a long mark length. A low pass filter and a circuit obtained by combining a mark length judgment circuit and a switch can be used as a normal resolution signal selection filter.

According to the present invention, it is possible to provide a large-capacity optical disc system, which uses a super resolution effect. The system cancels a normal resolution component from a readout signal of a super resolution disc, and thus makes it possible to improve quality of a readout signal only by circuit techniques. Accordingly, a good bit error rate can be obtained.

DETAILED DESCRIPTION OF THE PREFERRED EMBODIMENTS

Figure 6:
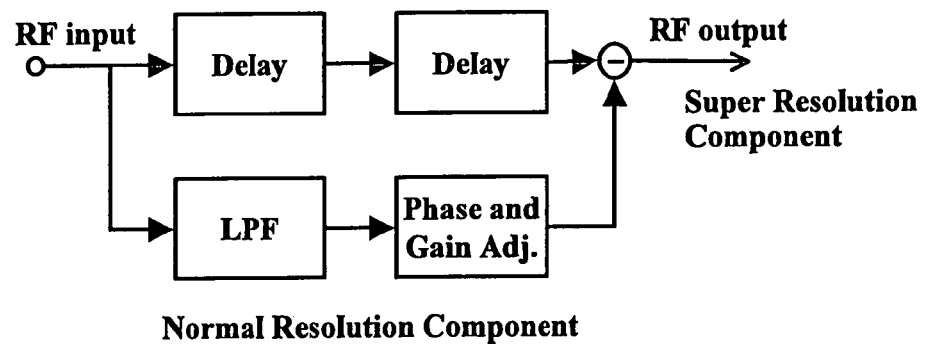
FIG. 6 is a block diagram illustrating a concept of a normal resolution cancel method according to the present invention.

FIG. 6 is a block diagram illustrating a concept of a normal resolution cancel method according to the present invention. As mentioned above, a normal resolution component is separated from a readout signal by a low pass filter by use of a difference in response to a mark length between the normal resolution signal and the super resolution signal. After gain and a phase are appropriately adjusted, the normal resolution component is subtracted from the original readout signal. The super resolution signal component in the readout signal can be fetched. The following descriptions will show that signal quality can be improved by a normal cancel method of the present invention.

Figure 2:
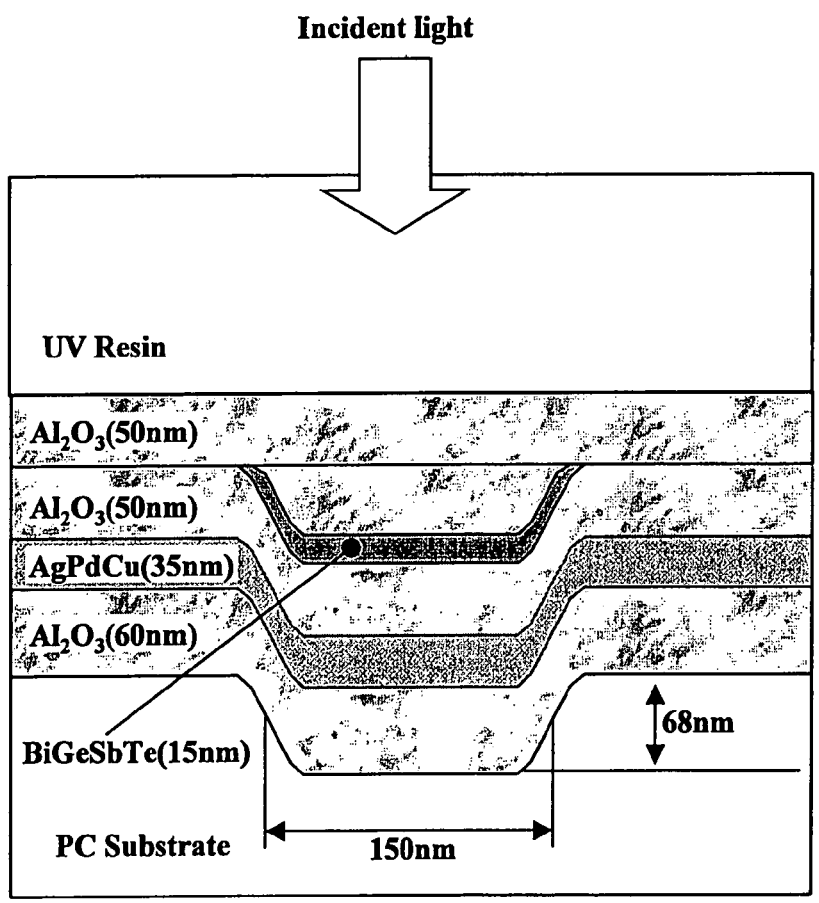
FIG. 2 is a schematic cross-sectional view illustrating a configuration example of a three-dimensional pit selection type disc.
Figure 3:
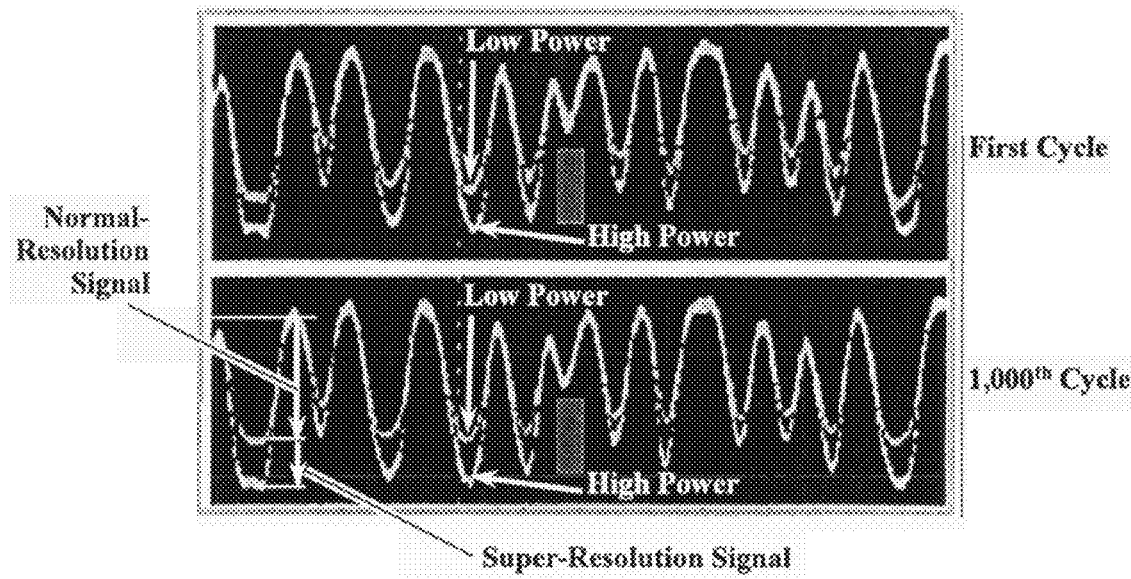
FIG. 3 is a diagram illustrating a measurement result of readout signals.
Figure 4:
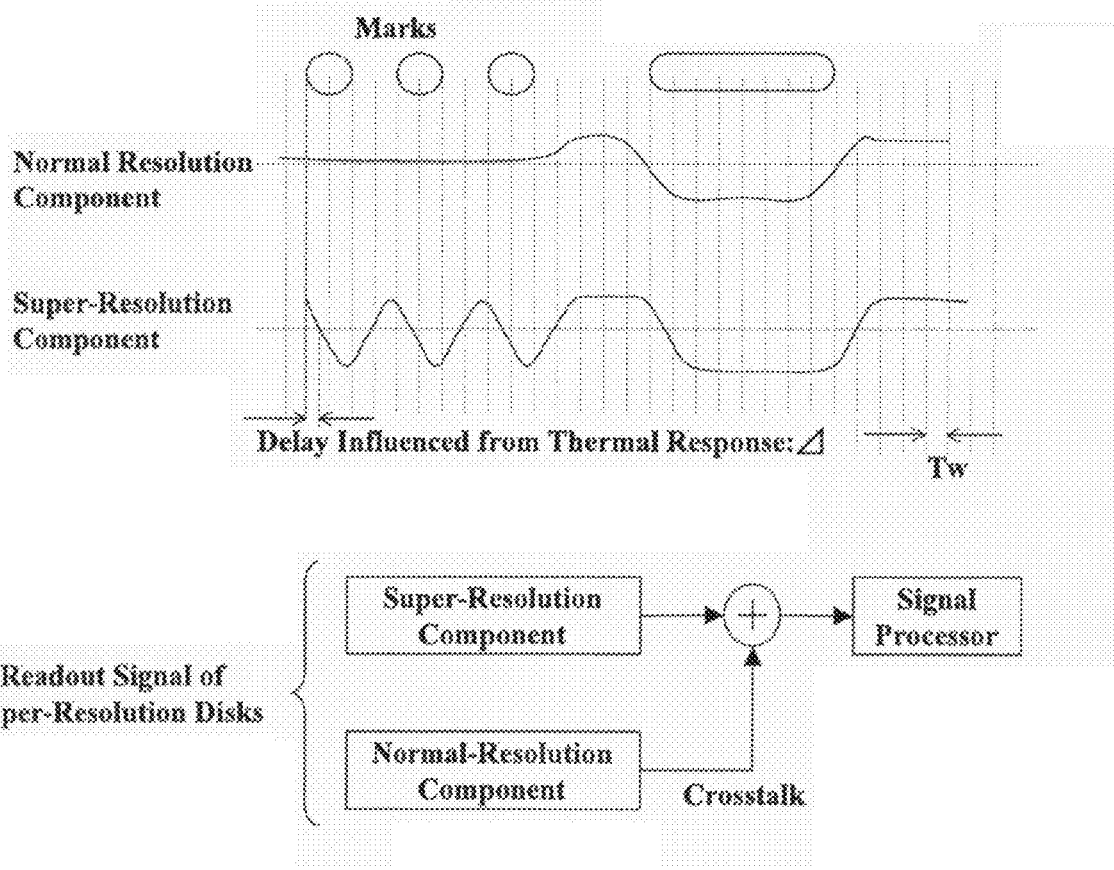
FIG. 4 is a view schematically illustrating signals obtained at the time of high power readout.
Figure 5:
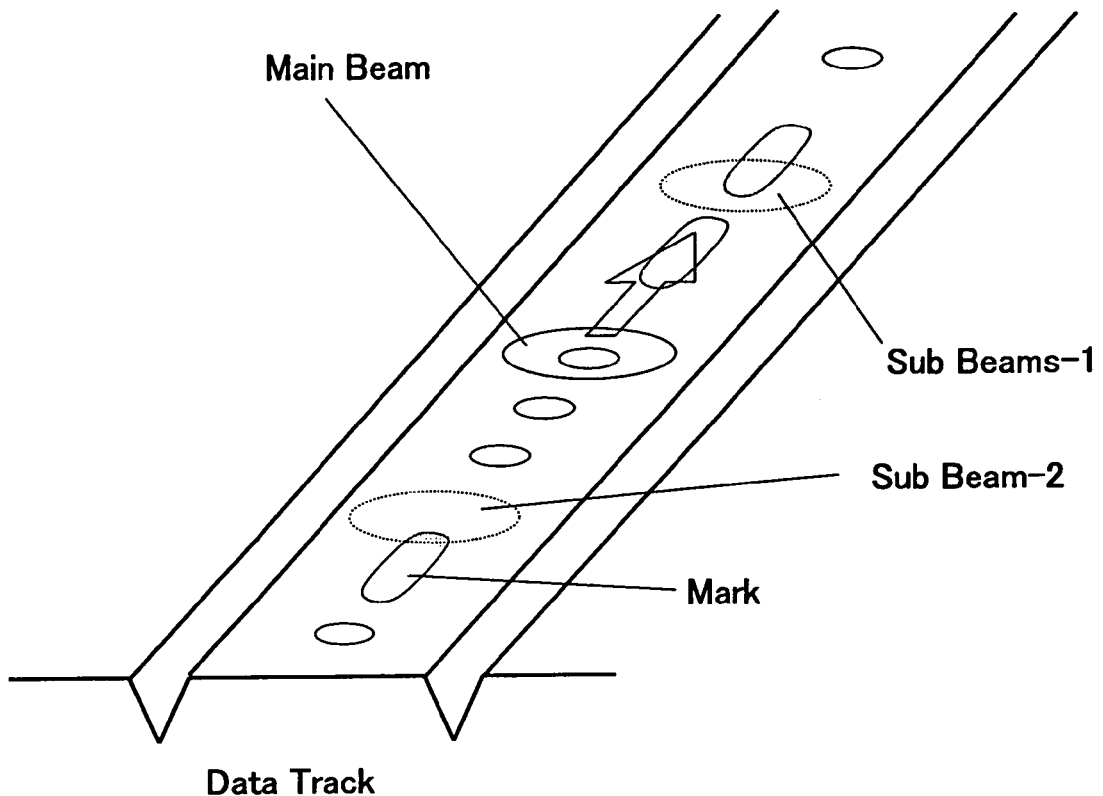
FIG. 5 is a view illustrating spot arrangement of the time when it is supposed that a conventional method is applied to a super resolution disc.
Figure 7:
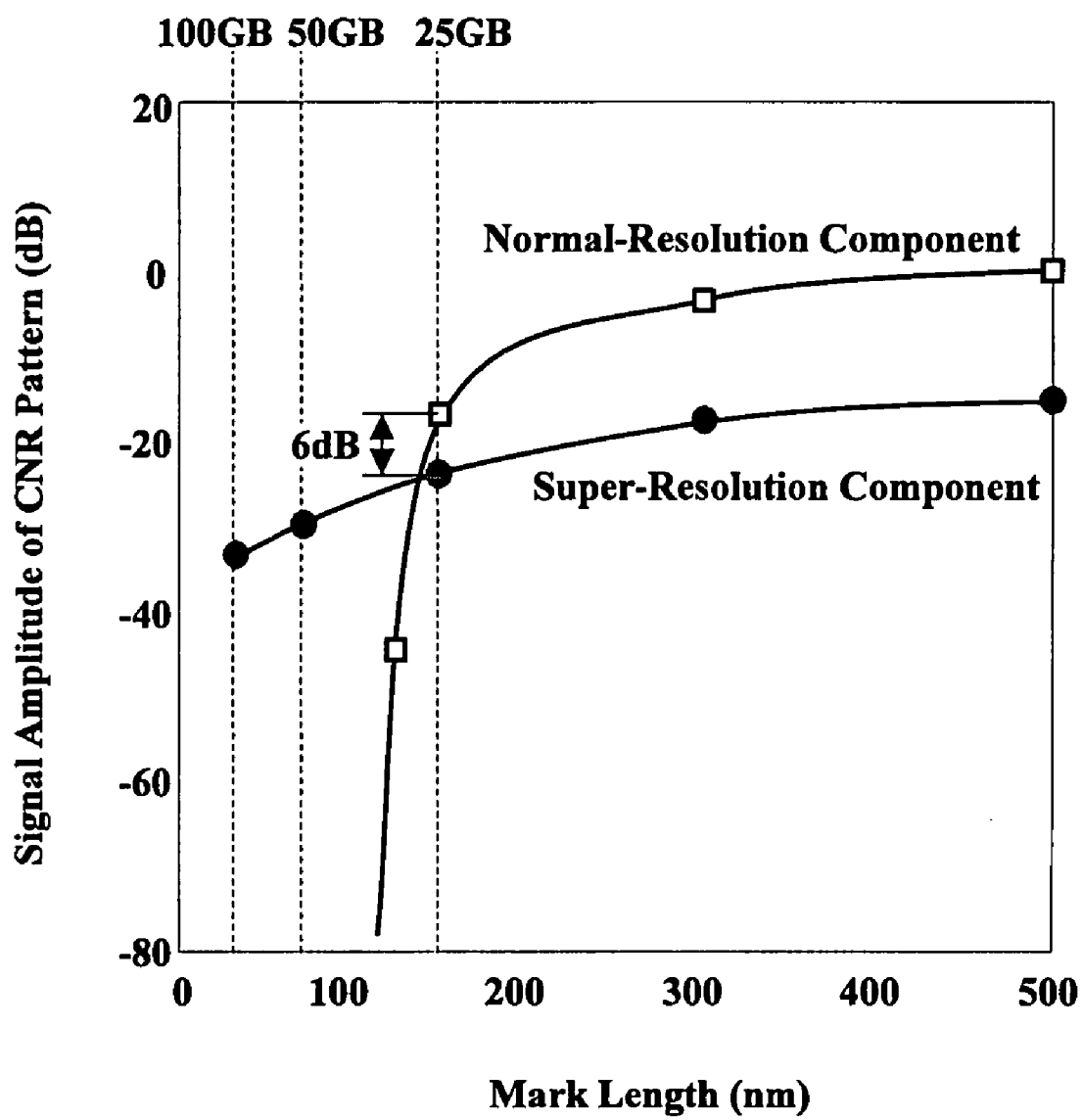
FIG. 7 is a graph illustrating a result of calculating a relationship between a mark length of a repetitive signal and signal amplitude thereof.

First, calculation of an electromagnetic field is carried out by an FDTD (Finite Differential Time Domain) method in order to examine mark length dependence of signal amplitude of each of the super resolution signal and the normal resolution signal. As a disc structure, one shown in FIG. 2 is used. By use of a model in which a phase-change recording film in the closest recording mark is evenly molten around the beam spot, readout signal amplitude at the time of high power (super resolution+normal resolution) is obtained, and readout signal amplitude at the time of low power (normal resolution) is obtained with all of the recording marks supposed to be in a crystalline phase. FIG. 7 is a graph illustrating a calculation result of a relationship between a mark length of a repetitive signal and signal amplitude thereof. Equation is given by Tw=75 nm. In FIG. 7, amplitude of the super resolution signal is obtained by subtracting a readout signal at the time of low power readout from a readout signal at the time of high power readout. In the case of using a RLL (1, 7) modulation code, a storage capacity of a disc with a diameter of 120 mm reaches about 25 GB in a case where a shortest mark length (2 Tw) is 150 nm. It is revealed that use of a three-dimensional selection type disc causes 2 Tw signal amplitude to be obtained even in a case where the storage capacity reaches a fourfold value of 100 GB, that is, where the shortest mark length is 37.5 nm. At this time, the mark length corresponding to a longest mark 8 Tw is 150 nm. In a case of the mark length of 150 nm, it is revealed that amplitude of the normal resolution signal is higher than that of the super resolution signal by about 6 dB.

Figure 8:
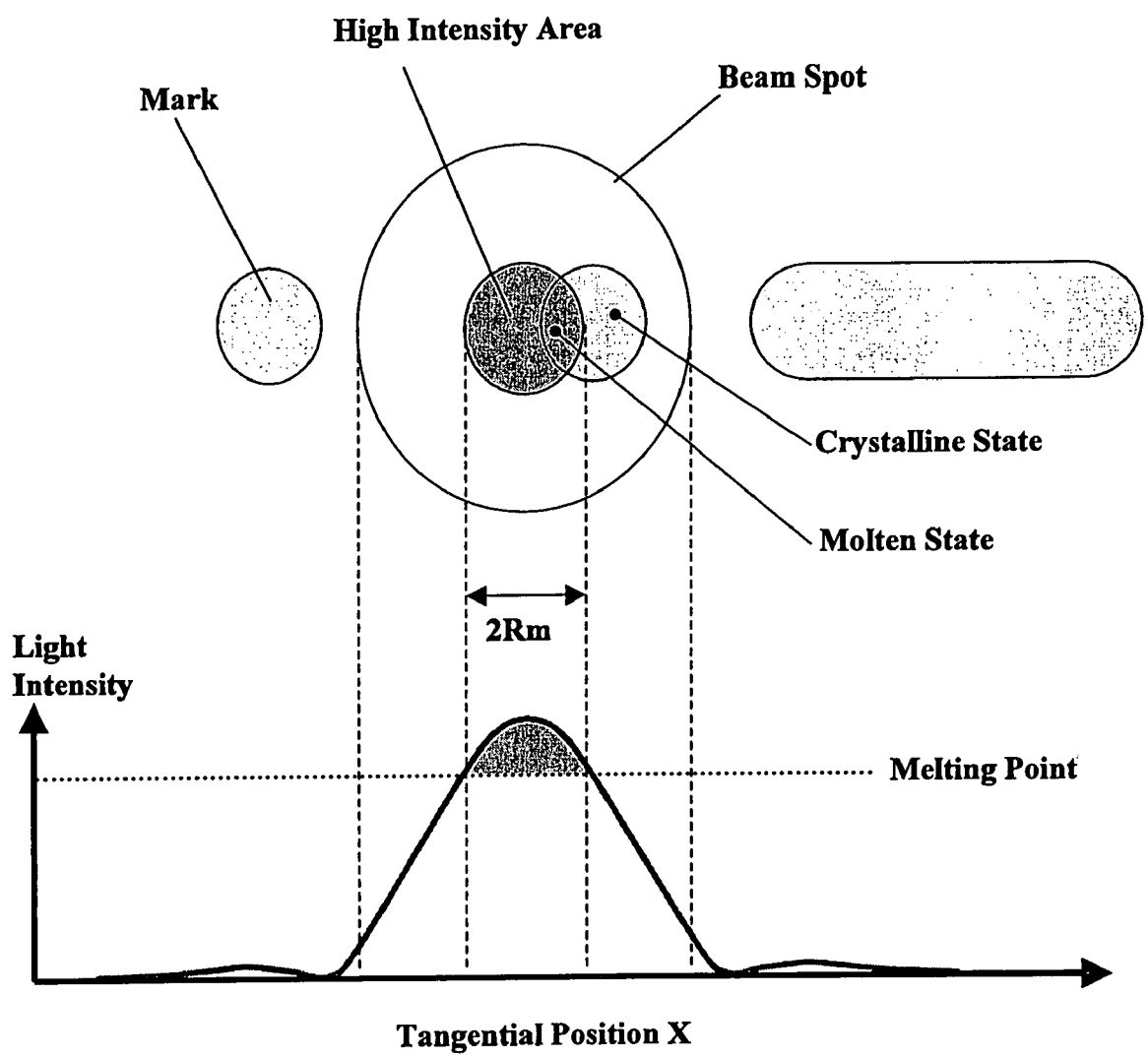
FIG. 8 is a view illustrating a model for calculating a super resolution signal.

In a case of calculating a readout signal with a length of one million Tw or more, namely, what is termed as a random pattern signal, the FDTD method cannot be applied for obtaining a bit error rate because of problems in computation time and memory use. For this reason, regarding the normal resolution signal, an impulse response is obtained by the well-known linear diffraction computation. Then, a -convolution of a binary data string of a RLL (1, 7) code and the obtained impulse response is performed to calculate a readout signal with a random pattern. Regarding the super resolution signal, a readout signal is calculated by a calculation model shown in FIG. 8. It is herein supposed that an area where a high density area (radius Rm) close to the center of a light beam and a recording mark overlap each other is molten, and that the area has reflectivity different from other areas. By accumulating approximate intensity distribution of beam spots with Gaussian distribution and reflectivity responses of the molten area, a super resolution signal is calculated.

Figure 9:
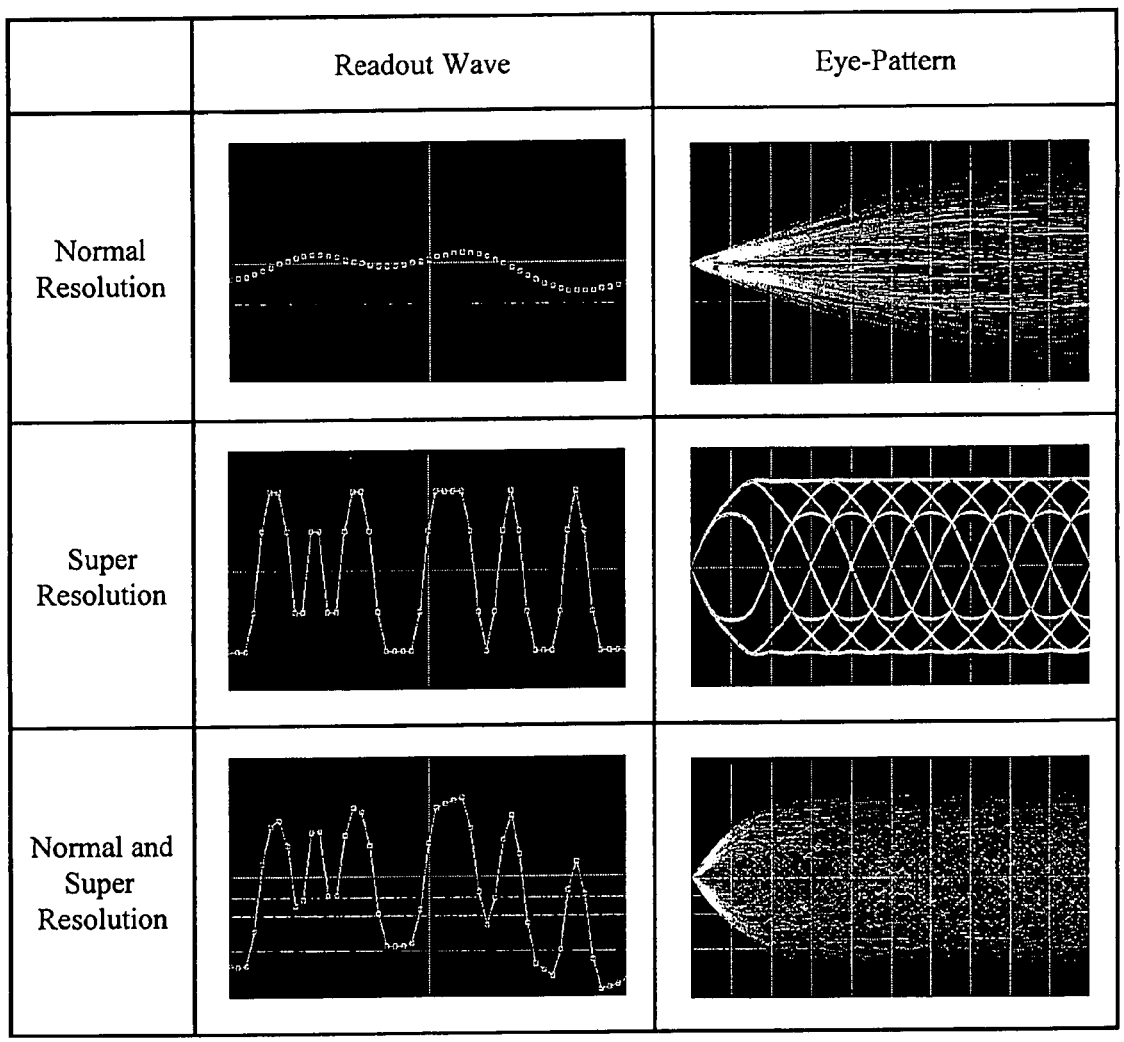
FIG. 9 is a view illustrating a result of calculating a random pattern readout signal of each of a super resolution signal and a normal resolution signal.

FIG. 9 is a view illustrating a result of calculating a random pattern readout signal of each of a super resolution signal and a normal resolution signal. Here, a wavelength of a light source is 405 nm, a numerical aperture of an objective lens is 0.85, a detection window width Tw is 18.75 nm, a mark width is 150 nm, a molten area radius Rm is 37.5 nm, a ratio in amplitude between the super resolution signal and the normal resolution signal in a repetitive signal 8 Tw is 1:2, and a phase shift between the super resolution signal and the normal resolution signal is 1 Tw. As shown in FIG. 9, in a readout signal to which the normal resolution signal added, signal quality significantly deteriorates, and an eye pattern is distorted as compared with the super resolution signal. Namely, this shows deterioration in the readout signal due to an influence of the normal resolution signal, and is a problem to be solved by the present invention.

Figure 10:
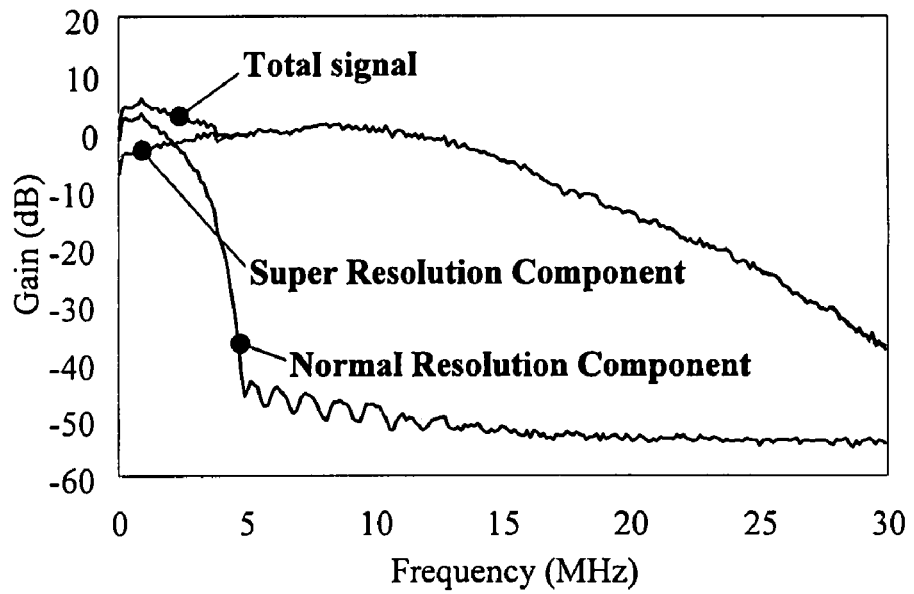
FIG. 10 is a graph illustrating a result of calculating a frequency characteristic of a random pattern signal.

FIG. 10 is a graph illustrating a result of calculating a frequency characteristic of each random pattern signal. In this event, a detection window width Tw is 15.15 ns, and a frequency of a 2 Tw repetitive signal is 16.5 MH. As can be seen in FIG. 10, a spectrum of a super resolution signal increases to a high frequency, while a normal resolution signal is drastically attenuated at 4 MHz or higher, reflecting optical resolution. A readout signal, to which a normal resolution signal and a super resolution signal added, has a spectrum representing a superimposition of both signals. Using a difference in frequency characteristic between the super resolution signal and the normal resolution signal makes it possible to separate a normal resolution signal component from the readout signal.

Figure 11:
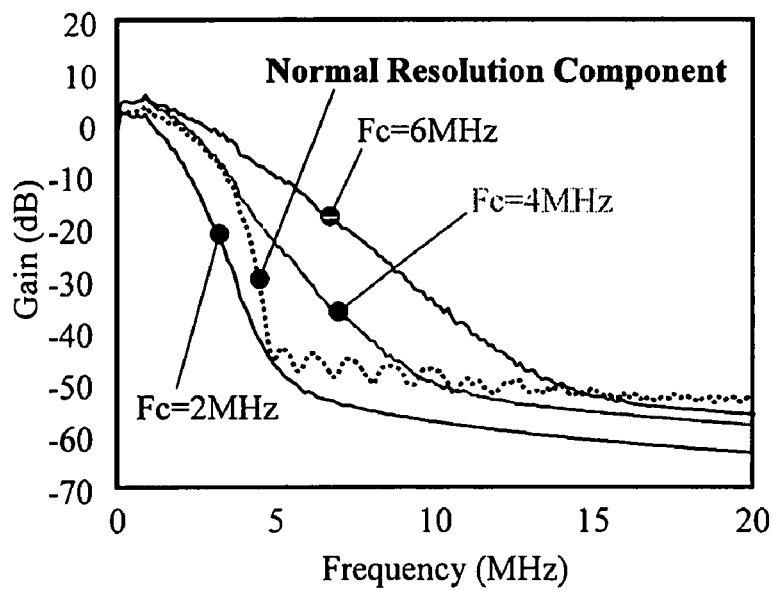
FIG. 11 is a graph illustrating a frequency characteristic of a signal obtained at the time when a readout signal is passed through each low pass filter.

FIG. 11 is a graph illustrating a result of calculating a frequency characteristic of a signal obtained at the time when a readout signal, to which the super resolution signal and a normal resolution are added, is passed through each of low pass filters having different cutoff frequencies 2, 4, and 6 MHz. The low pass filter used here is a sixth-order Bessel filter. As can be seen in FIG. 11, use of the low pass filter with cutoff frequency of 4 MHz causes a frequency characteristic close to the normal resolution signal to be obtained. In a case of RLL (1, 7) code, a shortest mark is 2 Tw and a longest mark is 8 Tw. Hence, frequencies of these repetitive signals are distributed from 16.5 MHz to 4.125 MHz. Meanwhile, a length of 8 Tw mark is 150 nm which is close to a mark length of optical resolution of 119 nm ($\lambda$/NA/4). Accordingly, the low pass filter with 4 MHz has an effect close to a filter effect of optical resolution, and a main component of a data signal is distributed in a high frequency of 4.125 MHz or higher. Thus, the main component of a modulation signal obtained by a super resolution effect is cut off by the low pass filter to allow the separation of the normal resolution signal from the readout signal.

Figure 12:
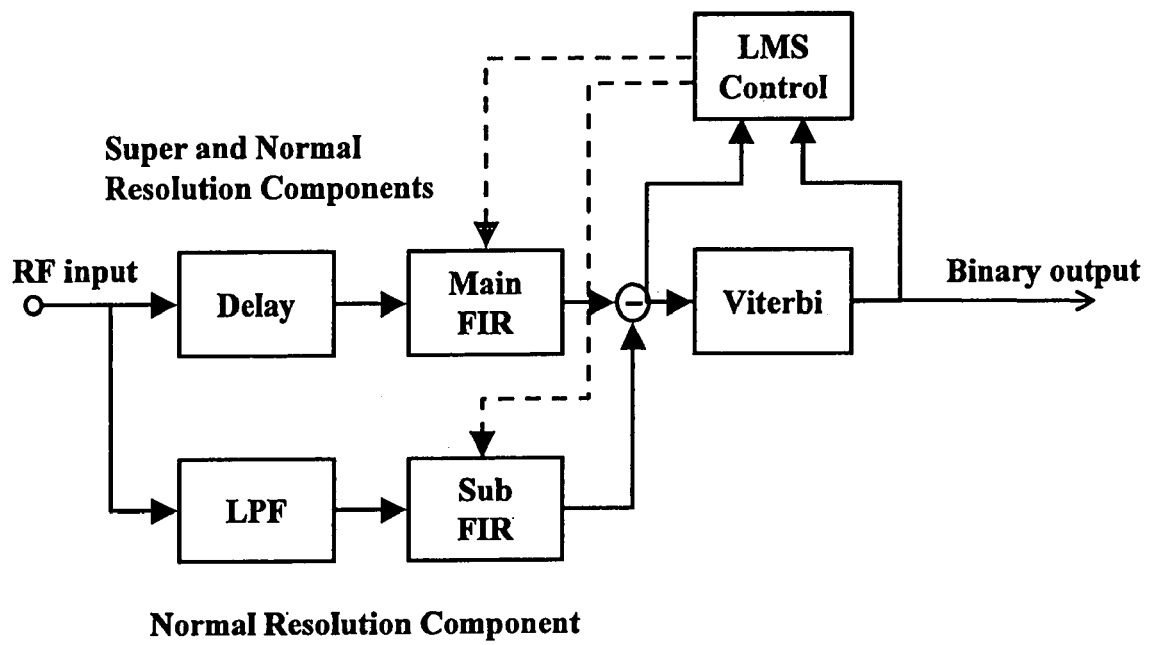
FIG. 12 is a view illustrating a specific configuration example of a readout signal processing circuit.

FIG. 12 is a view illustrating a specific configuration example of a readout signal processing circuit which implements the basic concept in FIG. 6 by using low pass filters. Hence, a Viterbi decoder is used as a binary system. Main and sub-FIR (Finite Impulse Response) filters, each having a variable tap coefficient, are used as automatic equalizers to filter the respective separated two signals. The number of taps in the above case is 15. A LMS (Least Means Square) method is used to update the tap coefficient. As a PR class of the Viterbi decoder, PR (1, 5, 5, 1) close to a frequency characteristic of a readout signal is selected, and a target signal is generated by a convolution of a binary signal as an output of the selected PR and an impulse response expressed by PR class (1, 5, 5, 1). Then, tap coefficients of two FIR filters are sequentially updated in such a way that an error between the generated target signal and the readout signal reaches the minimum.

Figure 13:
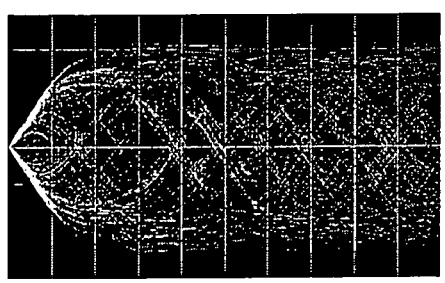
FIGS. 13A and 13B are views illustrating a result of measuring a signal-eye pattern and a signal bit-error rate at the time before and after the signal undergoes normal resolution signal cancel processing.
Figure 13:
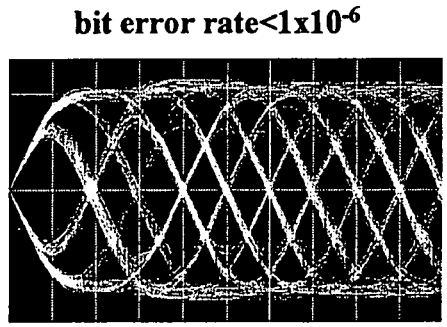

FIGS. 13A and 13B are views illustrating a result of measuring a signal-eye pattern and a signal bit-error rate at the time before and after the signal undergoes normal resolution signal cancel processing. FIG. 13A shows the signal before undergoing normal resolution signal cancel processing, and FIG. 13B shows the signal after undergoing normal resolution signal cancel processing. Here, a bit error rate measured in a case where normal resolution cancel processing is not performed is a value obtained as a bit error rate of the normal Viterbi decoder of PR (1, 5, 5, 1) class. It is shown that the normal resolution cancel processing remarkably improves quality of the readout signal, and improves the bit error rate from $1.4 \times 10^{-2}$ to $1 \times 10^{-6}$ or less.

Figure 14:
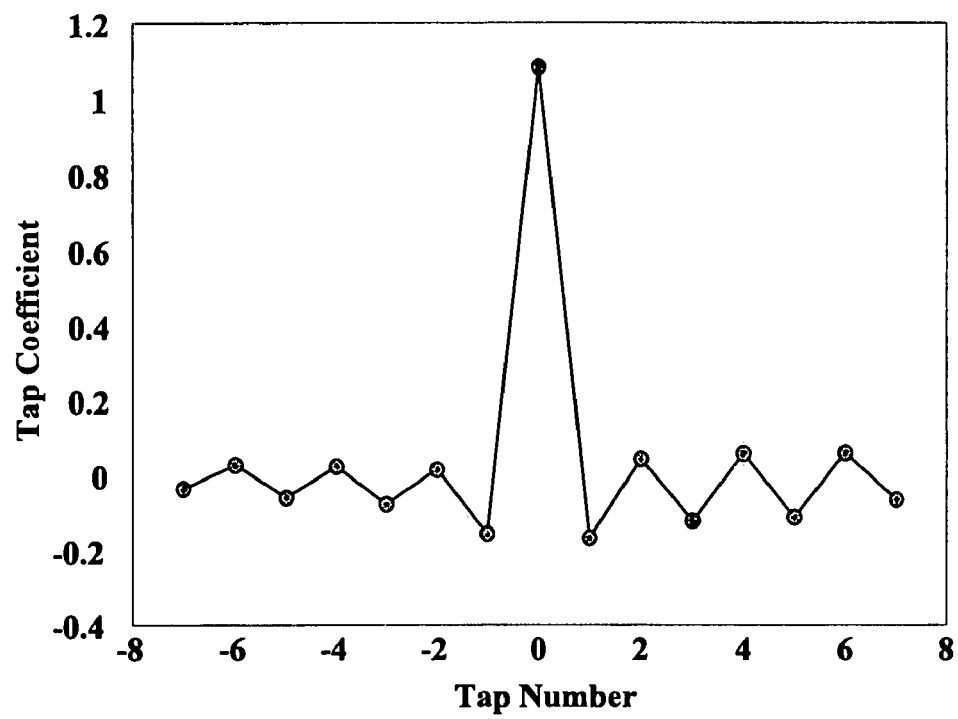
FIGS. 14A and 14B are graphs illustrating a tap coefficient of each of main and sub-FIR filters.
Figure 14:
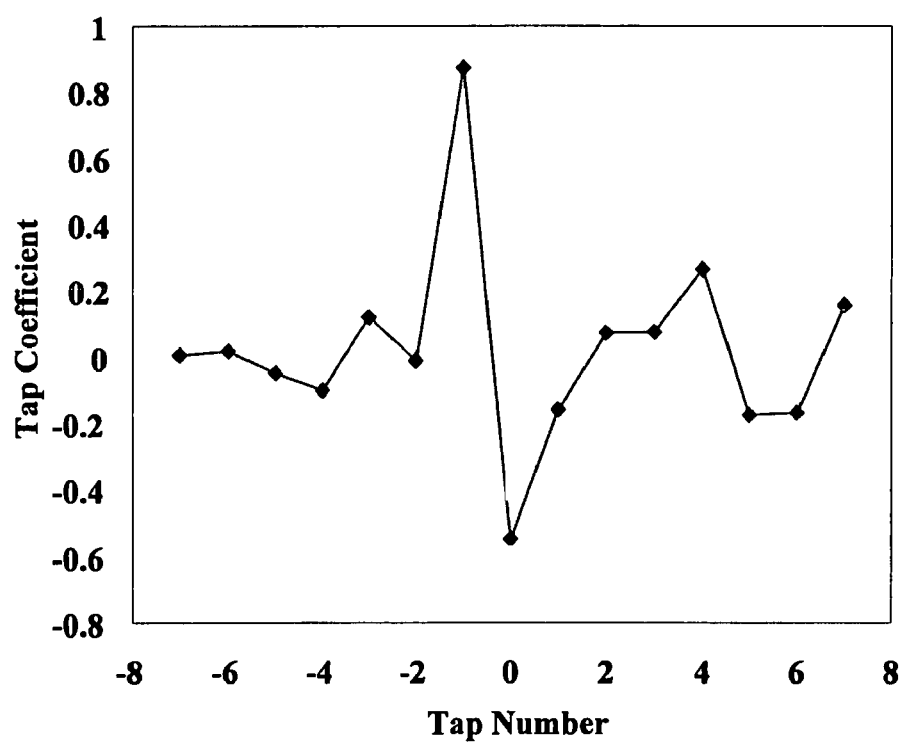

FIGS. 14A and 14B are graphs illustrating a tap coefficient of each of main and sub-FIR filters. FIG. 14A shows a tap coefficient of the main RIF filter, and is a result obtained when normal automatic equalization is performed. FIG. 14B shows a tap coefficient of the sub-FIR filter, and explains qualitatively a state where a tap coefficient of $-1$ Tw reaches a peak based on a phase difference 1 Tw between the normal resolution signal and the super resolution signal, and where a separated normal resolution component is subtracted therefrom.

Figure 15:
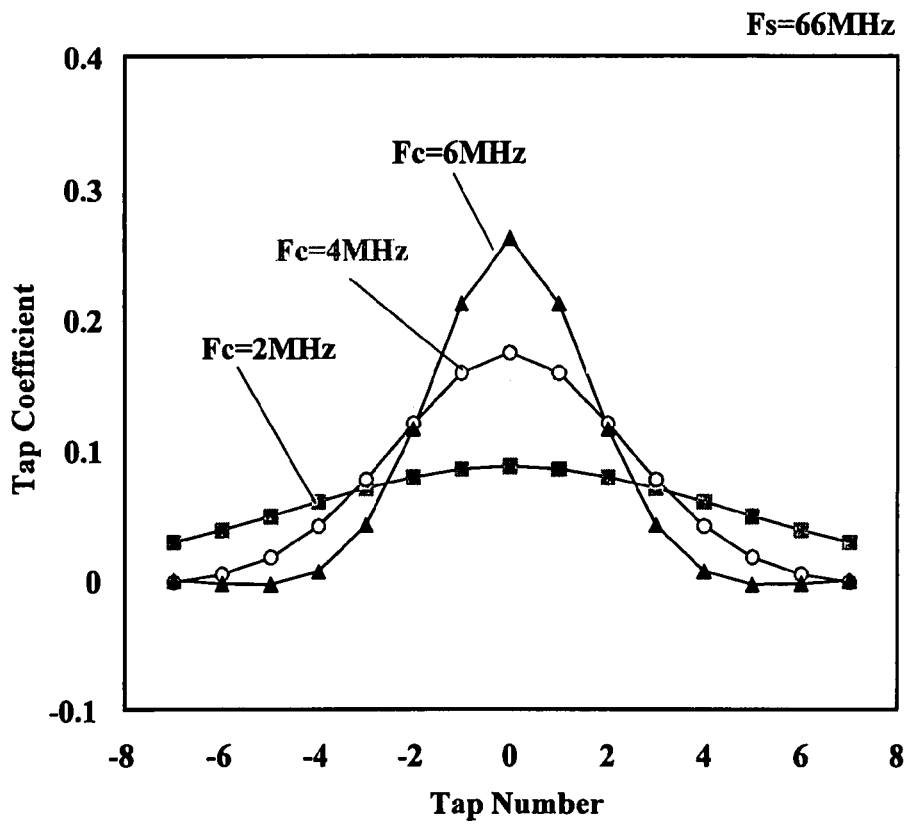
FIG. 15 is a graph illustrating a tap coefficient of a FIR filter used as a low pass filter.

FIG. 15 is a graph illustrating a tap coefficient of a FIR filter with 15 taps used as a low pass filter. Frequency characteristics of sixth-order Bessel filters with cutoff frequencies of 2, 4, and 6 MHz can be approximated with one another by changing the tap coefficient. In this event, the FIR filter with N (odd number) taps is used. In a case where each tap coefficient is fixed to be symmetric to a center tap, an amount of delay is (N−1)/2 at the time where the signal passes through the filter. Using the FIR filter as a low pass filter allows a delay amount to be uniquely fixed. A low pass filter shown in a configuration in FIG. 12 is a FIR filter with 15 taps, and a delay amount of the corresponding delay circuit is 7 Tw.

Figure 1:
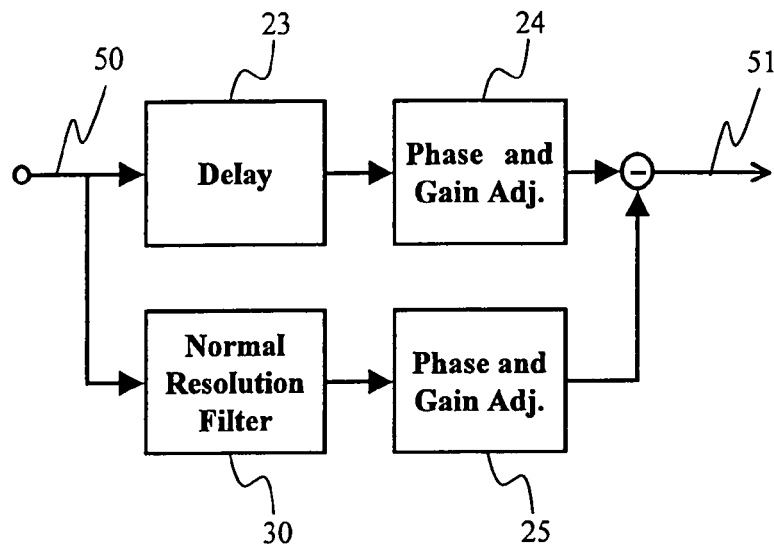
FIG. 1 is a view illustrating a configuration example of a data readout circuit appropriate for an optical disc device of the present invention.

Descriptions will be further provided for details of the present invention. FIG. 1 is a view illustrating a configuration example of a data readout circuit appropriate for an optical disc device of the present invention. A RF signal 50 detected by an optical head (not shown) is passed through a delay circuit 23. Thereafter, the RF signal 50 is appropriately equalized by a phase/gain adjuster 24. Concurrently, part of the RF signal 50 is separated therefrom by a normal resolution signal selection filter 30, and a phase and gain of the signal are appropriately adjusted by a phase/gain adjuster 25. By subtracting these signals, an output RF signal 51 can be obtained. This configuration is obtained by generalizing the readout signal processing circuit shown in FIG. 12. In the foregoing explanation, a low pass filter with a cutoff frequency of 4 MHz is used as the normal resolution signal selection filter 30, and a 15-tap FIR filter having an adaptive equalization function is used as each of the phase/gain adjusters 24 and 25. A configuration, for example, a configuration of the normal resolution signal selection filter 30 and the number of taps of the phase/gain adjusters 24 and 25, maybe selected according to a response of the super resolution disc.

Figure 16:
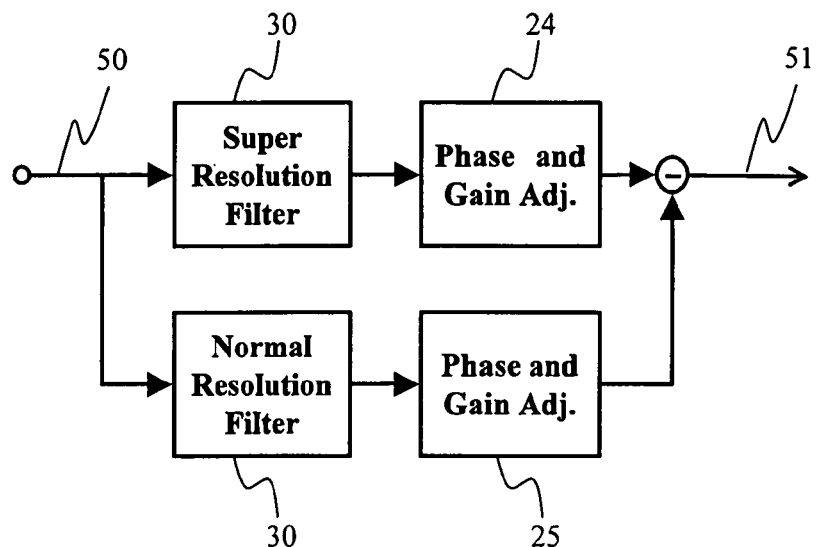
FIG. 16 is a view illustrating a configuration example of a readout signal processing circuit of the present invention.

FIG. 16 is a view illustrating a configuration example of a readout signal processing circuit of the present invention in a case where both of a normal resolution signal selection filter and a super resolution signal selection filter are used. As mentioned above, the super resolution signal component and normal resolution signal component, which are included in a readout signal, are different in frequency characteristic. For this reason, a super resolution signal selection filter 40, which extracts a super resolution signal component, is used in this configuration. As in the case of the aforementioned example, a low pass filter with a cutoff frequency of 4 MHz may be used as a normal resolution signal selection filter, and a high pass filter with a cutoff frequency of 1 MHz may be used as a super resolution signal selection filter. An overlap of cutoff frequency range (1 MHz to 4 MHz) of both filters is essential for preventing loss of a signal component in a case of performing subtraction of the normal resolution signal component and super resolution signal component. The phase/gain adjusters 24 and 25 are FIR filters for which the tap coefficient changes adaptively. Thus, using both of the normal resolution signal selection filter and the super resolution signal selection filter provides an advantage that loads of the phase/gain adjusters 24 and 25 are reduced, and that a circuit configuration can be simplified. In FIG. 16, in a case where the normal resolution signal selection filter and the super resolution signal selection filter are different in the number of taps thereof, the delay circuit 23 shown in FIG. 1 may be provided for delay adjustment of both filters.

Figure 17:
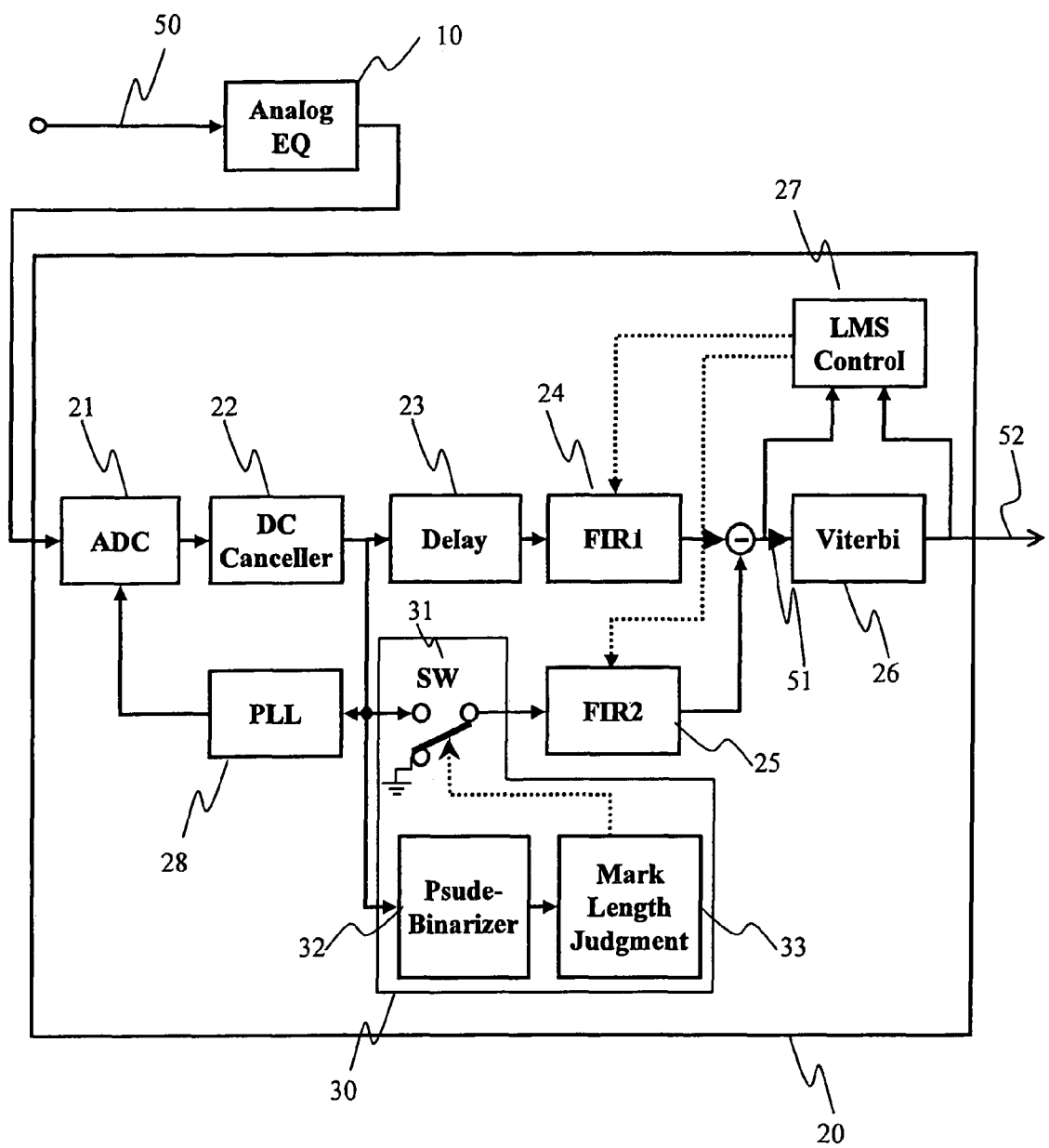
FIG. 17 is a view illustrating a configuration example of a readout signal processing circuit appropriate for the present invention.

FIG. 17 is a view illustrating a configuration example of a readout signal processing circuit appropriate for the present invention. In an analog equalizer 10, a RF signal 50 detected by an optical head (not shown) is subjected to equalization and AGC. Thereafter, the RF signal 50 is input to a digital signal processing section 20. In the digital signal processing section 20, the input RF signal is converted into a digital signal by an AD converter 21 at every clock. Thereafter, the RF signal is subjected to DC cancellation by a DC canceller 22, and then is digital equalized by an FIR filter 24 after being passed through a delay adjuster 23. Concurrently, part of the digitized RF signal is processed by a normal resolution signal selection filter 30, and is equalized by an FIR filter 25. Then, the resultant signal is subtracted from an output of the RIR filter 24, and is binarized by a Viterbi decoder 26 to be fetched as a binary output 52. Although not specifically described to prevent the present invention from exceeding the scope of the invention, an internal structure of the Viterbi decoder 40 is configured to compare a readout signal with a target signal generated by a convolution of a binary bit string and the PR class, and to sequentially select each binary bit string at which an error therebetween reaches the minimum. Learning process of tap coefficients of the FIR filter is carried out by an LSE control section 27. A PLL (Phase Locked Loop) circuit 28 extracts phase information from an output signal of the DC canceller 22, and controls an unillustrated VOC (Voltage Controlled Oscillator). Thereby, a clock signal is generated. With the aforementioned configuration, it is made possible to obtain the binary data 52 from the RF signal 50. The binary data 52 is input to a logic format decoder (not shown). Thus, data which is processed to be demodulated, and which is then recorded on an optical disc medium can be read.

In the configuration shown in FIG. 17, the normal resolution signal selection filter 30 is composed of a switch 31, a pseudo-binarizer 32, and a mark length determination device 33. The pseudo-binarizer 32 extracts only a code bit of the digitized RF signal, and is thus capable of obtaining a binary signal equivalent to that extracted by what is termed as a direct slice method. In a case of determining a mark length by the mark length determination device by using this example based on, for example, the aforementioned example, when a mark or a space is 8 T or more, the switch 31 is turned on to pass a readout signal, and when the mark or the space is less than 8 T, the switch 31 is turned off to cause the level of the readout signal to be zero. The above-mentioned configuration can provide the normal resolution signal selection filter 30 having more rapid selectivity than that in the low pass filter. Accordingly, the above configuration can be used for a case where the normal resolution cannot be sufficiently obtained only by a linear operation with a low pass filter, for example, where a detection window width Tw is longer than the aforementioned example of 18.75 nm and a normal resolution signal component included in a readout signal is high. Additionally, although not illustrated, in the switch 31, a delay adjuster for adjusting delay, which corresponds only to a processing time of the pseudo-binarizer 32 and mark length determination device 33, is disposed in the front row of a switch mechanism.

Figure 18:
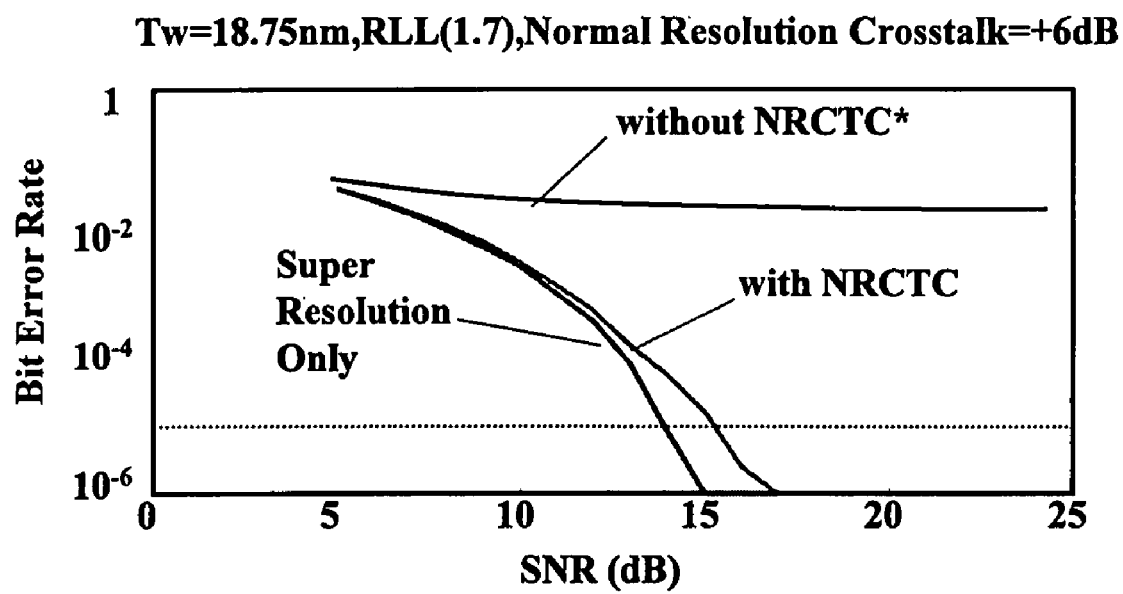
FIG. 18 is a graph illustrating a calculation result of a relationship between an S/N of a readout signal and a bit error rate thereof in a case where a readout signal processing circuit of the present invention is used.

FIG. 18 is a graph illustrating a calculation result of a relationship between an S/N of a readout signal and a bit error rate thereof in a case where a readout signal processing circuit of the present invention is used. Here, as a configuration of the normal resolution selection filter, one shown in FIG. 17 is used. The filter has a wavelength of a light source is 405 nm, a numerical aperture of an objective lens is 0.85, a detection window width Tw is 18.75 nm, a mark width is 150 nm, a radius Rm of a molten area is 37.5 nm, a ratio in amplitude between the super resolution signal and the normal resolution signal in a 8 Tw repetitive signal is 1:2, and a phase shift between the super resolution signal and the normal resolution signal is 1 Tw. S/N of the readout signal is defined as S/N=σ/A from half-value amplitude A of the super resolution signal component and standard deviation σ of Gaussian distribution random noise. As is apparent from FIG. 18, normal resolution crosstalk cancel (NRCTC) is provided, and a bit error rate is thus significantly improved. Accordingly, performance close to a result obtained only from the super resolution signal can be obtained.

Figure 19:
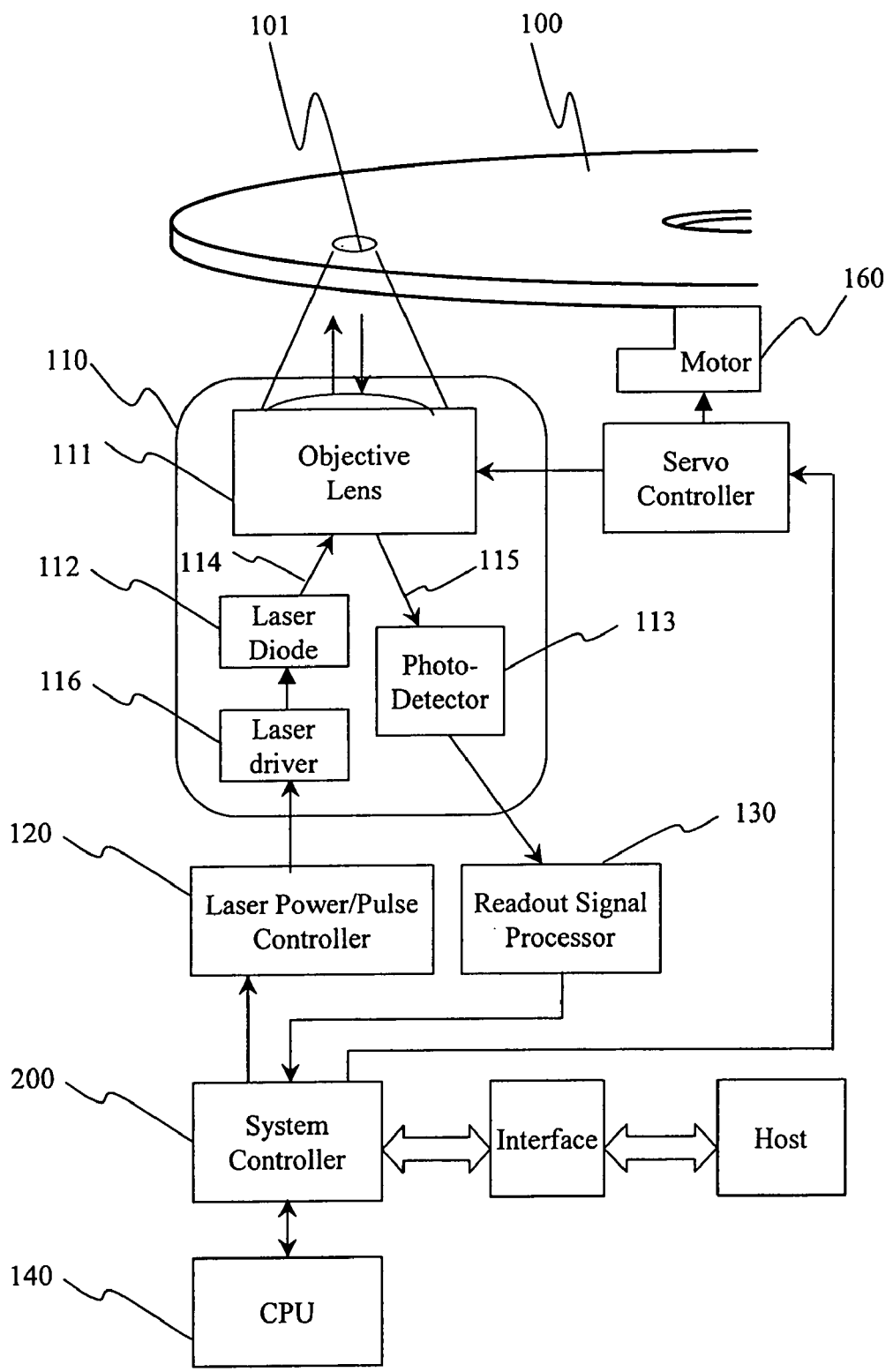
FIG. 19 is a schematic view illustrating a configuration example of an optical disc device of the present invention.

FIG. 19 is a schematic view illustrating a configuration example of an optical disc device of the present invention. An optical disc medium 100 is rotated by a spindle motor 160. At the time of readout, a laser power/pulse controller 120 controls current to be supplied to a semiconductor laser 112 via a laser driver 116 in an optical head 110 to generate a laser beam 114 so that light intensity instructed by the CPU 140 can be obtained. The laser beam 114 is condensed with an objective lens 111 to form a beam spot 101 on the optical disc medium 100. A reflected light 115 from the beam spot 101 is detected through the objective lens 111 by a photodetector 113. The photodetector is composed of a plurality of divided photodetection elements. A readout signal processing circuit 130 reads information recorded on the optical medium 100 by using a readout signal detected by the optical head 110. The read signal processing circuit of the present invention is incorporated into a readout signal integrated processing circuit 130. The readout signal integrated processing circuit 130 performs processing such as focus control, generation of an error signal for tracking control, extraction of address information by processing a wobble signal, using a signal detected by an optical head 110, in addition to a function of reading digital information recorded on the optical disc. Control of the entire optical disc device can be implemented by a system control circuit 200 on the basis of an instruction from a CPU 140.

The present invention can be used in the optical disc device for reading information from a large-capacity optical disc medium which makes use of a super resolution effect.

What is claimed is:

1. An optical disc device comprising:
photoelectric conversion means which converts a reflected light from an optical disc medium into an electric signal to generate a readout signal;
a super resolution signal selection filter through which a super resolution signal component of the readout signal is passed;
a normal resolution signal selection filter through which a normal resolution signal component of the readout signal is passed;
first adaptive equalizing means which adaptively equalizes a signal passed through the super resolution signal selection filter while adaptively changing a tap coefficient;
second adaptive equalizing means which adaptively equalizes a signal passed through the normal resolution signal selection filter while adaptively changing a tap coefficient;
subtracting means which subtracts an output signal of the second adaptive equaling means from an output signal of the first adaptive equalizing section; and
binarizing means which binaries an output signal of the subtracting section to read digital information recorded on the optical disc medium.

2. The optical device according to claim 1, wherein
the super resolution signal selection filter is a high pass filter, and
the normal resolution signal selection filter is a low pass filter with a cutoff frequency higher than that of the high pass filter.

3. An optical disc device comprising:
photoelectric conversion means which converts a reflected light from an optical disc medium into an electric signal to generate a first readout signal;
a normal resolution signal selection filter which extracts a normal resolution signal component as a second readout signal from the first readout signal;
a delay circuit which delays a phase of the first readout signal by a predetermined amount with respect to the second readout signal;
subtracting means which subtracts the second readout signal from the first readout signal passed through the delay circuit;
binarizing means which binaries an output signal of the subtracting section to read digital information recorded on the optical disc medium;
a first phase/gain adjuster which adjusts a phase and gain of a signal passed through the delay circuit; and
a second phase/gain adjuster which adjusts a phase and gain of a signal passed through the normal resolution signal selection filter;
wherein the subtracting circuit subtracts an output of the second phase/gain adjuster from an output of the first phase and gain adjuster.

4. The optical disc device according to claim 3, wherein
the binarizing means is a Viterbi decoder, and
the first phase/gain adjuster and the second phase/gain adjuster are adaptive equalizing means which adaptively equalize the respective first readout signal and the second readout signal while adaptively changing a tap coefficient according to an output of the Viterbi decoder.

5. The optical disc device according to claim 3, wherein
the normal resolution signal selection filter has a mark length determination device and a switch which turns on and off a signal, and
the switch is turned on to pass the first readout signal through the second phase/gain adjuster when the mark length determination device determines that the first readout signal is caused by a mark longer than a predetermined mark length.

6. The optical disc device according to claim 3, wherein the normal resolution signal selection filter is a low pass filter.

* * * * *